(12) United States Patent
Savolainen et al.

(10) Patent No.: US 9,936,473 B2
(45) Date of Patent: Apr. 3, 2018

(54) METHOD AND APPARATUS FOR MANAGING RADIO INTERFACES

(75) Inventors: Teemu Savolainen, Nokia (FI); Markus Isomäki, Espoo (FI); Johanna Nieminen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/115,044

(22) PCT Filed: May 3, 2011

(86) PCT No.: PCT/FI2011/050408
§ 371 (c)(1),
(2), (4) Date: Jan. 9, 2014

(87) PCT Pub. No.: WO2012/150374
PCT Pub. Date: Nov. 8, 2012

(65) Prior Publication Data
US 2014/0169353 A1    Jun. 19, 2014

(51) Int. Cl.
*H04W 60/04* (2009.01)
*H04W 72/12* (2009.01)
(Continued)

(52) U.S. Cl.
CPC ......... *H04W 60/04* (2013.01); *H04L 61/2007* (2013.01); *H04W 60/00* (2013.01);
(Continued)

(58) Field of Classification Search
CPC . H04W 88/06; H04W 72/1215; H04W 28/26; H04W 60/04; H04W 60/00;
(Continued)

(56) References Cited

U.S. PATENT DOCUMENTS 7,965,676 B2 *  6/2011  Dimou et al. ............... 370/328
8,752,161 B1 *  6/2014  Thai et al. .................. 726/12
(Continued)

FOREIGN PATENT DOCUMENTS

WO      2009089643       7/2009
WO   WO 2009089643 A1   7/2009

OTHER PUBLICATIONS

International Search Report and Written Opinion received for corresponding Patent Cooperation Treaty Application No. PCT/FI2011/050408, dated Feb. 3, 2013, 12 pages.
(Continued)

*Primary Examiner* — Ian N Moore
*Assistant Examiner* — Justin T Van Roie
(74) *Attorney, Agent, or Firm* — Seppo Laine Oy

(57) ABSTRACT

In accordance with an example embodiment, there is provided an apparatus, comprising a receiver configured to receive from a second apparatus over a first radio interface a first message comprising a registration request, a transmitter configured to transmit a second message to the second apparatus over the first radio interface, the second message comprising an acknowledgement of the registration request, and a processor configured to reserve an interface identifier for the second apparatus, wherein the processor is configured to not allow the reserved interface identifier to be used by further nodes over at least one further radio interface.

17 Claims, 5 Drawing Sheets

(51) Int. Cl.
    *H04L 29/12*     (2006.01)
    *H04W 60/00*     (2009.01)
    *H04W 8/26*     (2009.01)
    *H04W 88/06*     (2009.01)

(52) U.S. Cl.
    CPC ..... *H04W 72/1215* (2013.01); *H04L 61/6004* (2013.01); *H04L 61/6022* (2013.01); *H04L 61/6059* (2013.01); *H04W 8/26* (2013.01); *H04W 88/06* (2013.01)

(58) Field of Classification Search
    CPC .. H04W 8/26; H04L 61/2007; H04L 61/6022; H04L 61/6004; H04L 61/6059
    See application file for complete search history.

(56) References Cited

U.S. PATENT DOCUMENTS

| | | | |
|---|---|---|---|
| 2004/0024884 A1* | 2/2004 | Rekimoto | G06F 1/1613 709/228 |
| 2005/0271032 A1 | 12/2005 | Yun et al. | |
| 2008/0187001 A1* | 8/2008 | Vaswani et al. | 370/466 |
| 2009/0146833 A1 | 6/2009 | Lee et al. | |
| 2010/0023617 A1* | 1/2010 | Tremaine et al. | 709/224 |

OTHER PUBLICATIONS

Shelby Z et al.: "Neighbor Discovery Optimization for Lower-power and Lossy Networks", ND Optimization for LLNs, Dec. 2010.

\* cited by examiner

METHOD AND APPARATUS FOR MANAGING RADIO INTERFACES

RELATED APPLICATION

This application was originally filed as PCT Application No. PCT/FI2011/050408 filed May 3, 2011.

TECHNICAL FIELD

The present application relates generally to connectivity using multiple radio technologies.

BACKGROUND

Several radio communication technologies have been described in recent years. Different technologies have been designed for different, sometimes specific, uses. In order for a radio communication, or radio access, technology to be widely usable it may be standardised using open or proprietary standards which define how radios must operate in order to be capable of communicating with each other using the technology in question.

Wideband code division multiple access, WCDMA, technology has been developed by the third generation partnership project, 3GPP, for use in general cellular communication. Design priorities in WCDMA are flexible quality of service, reasonable energy efficiency, privacy and mobility. Similarly the TETRA standard has been designed as a variant of commercial cellular technologies for use in applications where security in particular is emphasized.

Wireless local area network, WLAN, technologies have been developed to provide high datarates for nodes that may not be very mobile. WLAN has been standardised by the Institute of Electrical and Electronics Engineers, IEEE. WLAN networks may have smaller coverage areas than cellular networks, and personal-area networks may have smaller still coverage areas spanning only a few meters at the smallest. Examples of personal-area networks are Bluetooth and Zigbee networks.

Some communication devices are furnished with capability to communicate using more than one radio communication technology. For example a mobile phone may communicate using cellular technology when transferring speech during high mobility and the mobile phone may communicate using WLAN when transferring data files during low mobility. A mobile phone may also be capable of communicating with a wireless headset using a personal-area technology, for example.

SUMMARY

Various aspects of examples of the invention are set out in the claims.

According to a first aspect of the present invention, there is provided an apparatus, comprising a receiver configured to receive from a second apparatus over a first radio interface a first message comprising a registration request, a transmitter configured to transmit a second message to the second apparatus over the first radio interface, the second message comprising an acknowledgement of the registration request, and a processor configured to reserve an interface identifier for the second apparatus, wherein the processor is configured to not allow the reserved interface identifier to be used by further nodes over at least one further radio interface.

According to a second aspect of the present invention there is provided a method, comprising receiving from a second apparatus over a first radio interface a first message comprising a registration request, transmitting a second message to the second apparatus over the first radio interface, the second message comprising an acknowledgement of the registration request, and reserving an interface identifier for the second apparatus, wherein the reserving comprises not allowing the reserved interface identifier to be used by further nodes over at least one further radio interface.

According to a third aspect of the present invention, there is provided an apparatus comprising at least one processor, at least one memory including computer program code, the at least one memory and the computer program code configured to, with the at least one processor, cause the apparatus to at least transmit over a first radio interface to a gateway node a first message comprising a registration request, receive a second message from the gateway node over the first radio interface, the second message comprising an acknowledgement of the registration request, transmit a third packet addressed to a further network via the gateway node via a second radio interface, using an interface identifier determined over the first radio interface without performing address configuration procedures over the second radio interface.

According to a fourth aspect of the present invention, there is provided a computer program product comprising a computer-readable medium bearing computer program code embodied therein for use with a computer, the computer program code comprising code for receiving from a second apparatus over a first radio interface a first message comprising a registration request, code for transmitting a second message to the second apparatus over the first radio interface, the second message comprising an acknowledgement of the registration request, and code for reserving an interface identifier for the second apparatus, wherein the reserving comprises not allowing the reserved interface identifier to be used by further nodes over at least one further radio interface.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
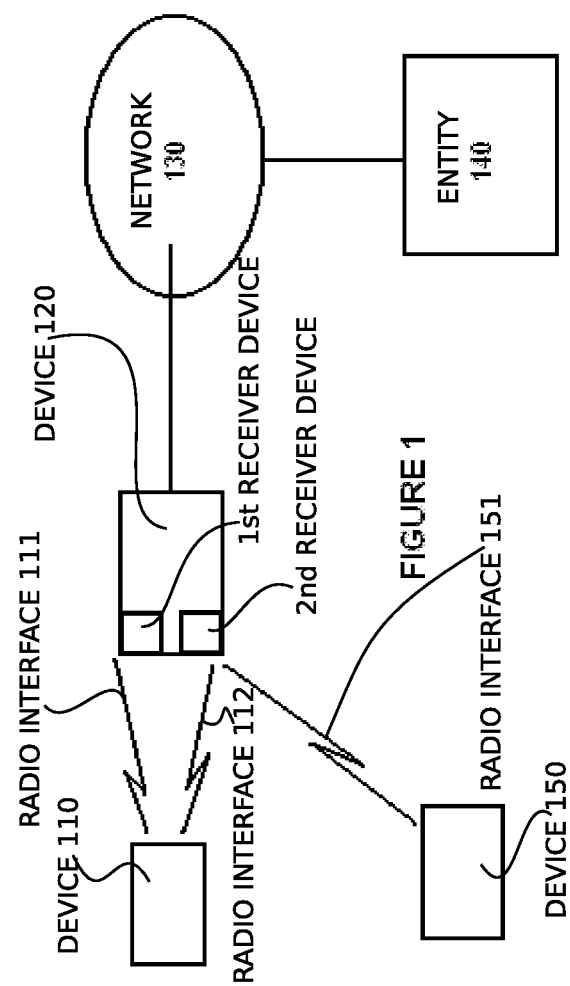
FIG. 1 illustrates an example system capable of supporting some embodiments of the invention.

FIG. 1 illustrates an example system capable of supporting some embodiments of the invention. Illustrated is device 110, which may be, for example, an automated sensor such as an electricity usage meter, temperature meter, gas flow meter, radiation level meter or closed-circuit television camera module, for example. Device 110 may alternatively be a cellular telephone, personal digital assistant, laptop, tablet device or other computing, communication or data storage apparatus. Device 110 is capable of communicating with device 120. In the following, device 120 will be referred to as gateway 120 for convenience. Device 120 may be configured to act as a gateway, but the invention is not limited thereto. Gateway 120 may be a fixed gateway hub providing connectivity to devices such as device 110, or depending on the embodiment it may be a mobile device, in some embodiments device 120 is a mobile device similar to device 110.

Device 110 may be capable of communicating with device 120 using radio interface 111. Radio interface 111 may comprise an uplink for conveying information from device 110 to gateway 120. Radio interface 111 may comprise a downlink for conveying information from gateway 120 to device 110. Radio interface 111 may operate according to a radio communication technology such as a personal-area networking technology, cellular technology or WLAN technology. For example, radio interface 111 may operate according to Bluetooth technology. Device 110 may also be capable of communicating with gateway 120 using radio interface 112, which may operate according to another technology than radio interface 111. For example, radio interface 112 may operate using a WLAN technology.

Gateway 120 may be configured to communicate with a network 130, for example the Internet or another network. Network 130 may be operably connected to entity 140, so that information originating from device 110 may be ultimately routed to entity 140 via gateway 120 and network 130. For example, where device 110 is a remote sensing device or utility meter, it may be configured to periodically report information to a datasystem of a utility company. The communication connections between gateway 120 and network 130, and between network 130 and entity 140, may be wire-line or wireless, for example microwave, connections. The connection between gateway 120 and network 130 needn't be the same type as between network 130 and entity 140. The connection between gateway 120 and network 130 may be at least in part a cellular data connection.

In addition to device 110, gateway 120 may be configured to communicate wirelessly with another device 150, which may be similar to device 110, or alternatively different. Communication between gateway 120 and device 150 occurs over radio interface 151. Radio interface 151 may use a radio communication technology that is used also on radio interface 111 or radio interface 112, so that gateway 120 may be configured to receive information from device 110 and device 150 using a same radio interface such as, for example, WLAN.

When communicating with gateway 120, device 110 is provisioned with an address, such as an internet protocol, IP, address. IP addresses are provisioned in the form of IPv4 and IPv6 addresses, with either one or optionally both used at one time. As device 110 communicates with gateway 120 using, for example, radio interface 111 it may use an address obtained via radio interface 111. Should device 110 then change to using radio interface 112 for communication with gateway 120, it may obtain a new address for use on radio interface 112. Obtaining a new address takes time, wherefore it would be useful for device 110 to be capable of switching between radio interface 111 and radio interface 112 without delays.

Figure 3:
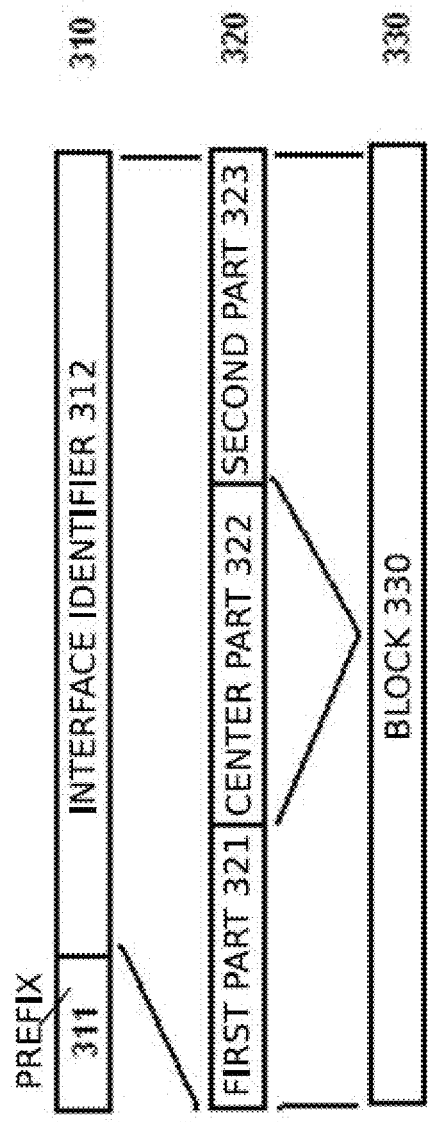
FIG. 3 illustrates an example IPv6 address.

FIG. 3 illustrates an example IPv6 address. Block 310 corresponds to an entire IPv6 address, which comprises a prefix 311 and an interface identifier 312. Prefix 311 may comprise a routing prefix and a subnet identifier, for example. In this example, interface identifier 312 is derived from an EUI-64 interface identifier 320. The EUI-64 interface identifier 320 comprises a first section of a medium-access control, MAC, address, 321, a second part of the MAC address, 323, and a center part 322. Center part 322 may be a constant, such as hexadecimal FF:FE, for example. Block 330 illustrates a MAC address, which can be split to first part 321 and second part 323 when deriving a EUI-64 interface identifier 320. When processing a EUI-64 interface identifier 320 into an interface identifier 312, bit operations may be performed. For example, the seventh-most significant bit may be inverted to indicate the interface identifier has global scope. An EUI-64 interface identifier may therefore be a modified version of a normal MAC address.

Some radio communication technologies are better suited to keeping connectivity open for a long time, whereas others are more suited to bursts of data. Therefore, it may be desirable to keep device 110, for example, connected to gateway 120 using a low-power technology such as Bluetooth or Bluetooth-low energy when no particular data needs to be transmitted, and then switch to a higher-bandwidth technology when data becomes available for transmission. These technologies may correspond to radio interfaces 111 and 112, for example. In an example embodiment, device 110 may be a video camera that is activated by a sensor. When the sensor isn't triggered no data is transmitted and device 110 may remain connected to gateway 120 via radio interface 111. When the sensor detects motion in a field-of-view of the camera module, a relatively high datarate of video data, such as encoded video data, may need to be transmitted via gateway 120 to entity 140, for example. In such a case, it becomes beneficial in this example if device 110 can switch from radio interface 111 to radio interface 112 with minimum latency. Also, allowing device 110 to keep transmitting from a similar address may be beneficial as it may simplify signaling in network 130, for example. A seamless transition from radio interface 111 to radio interface 112 improves connectivity also end-to-end with entity 140 since entity 140 will observe traffic arriving from the same, unique address regardless of which radio interface device 110 decides to use. Responsive to all data having been transmitted, device 110 may switch back to radio interface 111.

Keeping the same address on two or more radio interfaces allows device 110 to forego neighbour discovery procedures when transferring from a Bluetooth radio interface to a WLAN radio interface or vice versa, for example. In terms of gateway 120, keeping the same address may mean keeping the same interface identifier 312 as units communicating via gateway 120 may use the same prefix 311. When device 110 is connected over radio interface 111, only, to gateway 120 it may be capable of reserving the right to use the same interface identifier also on radio interface 112. This means that while device 110 isn't using radio interface 112, further devices 150 shouldn't be allowed to take the interface identifier into use on radio interface 112. Further devices obtain interface identifiers via neighbour discovery procedures and gateway 120 may be configured to prevent, when participating in neighbour discovery procedures on radio interface 112, further devices from obtaining an interface identifier allocated to device 110 on radio interface 111. When using IPv4, the IP address may be considered to be an interface identifier or more generally, an interface identifier may be any identifier of an interface.

According to embodiments of the invention, a device 110 may be configured to indicate to gateway 120 that it desires to cause its interface identifier to become reserved on a radio interface other than the radio interface being used for the indicating.

A first apparatus, such as gateway 120, may comprise a receiver configured to receive a first message comprising a registration request. For example, a first message such as a neighbour solicitation message may be received via radio interface 111 from a second apparatus such as device 110, for example. An example of a registration request is an address registration request indicated in an address registration option, ARO. The first apparatus may be configured to, responsive to the first message, transmit a second message to the second apparatus, such as device 110, using the same radio interface as was used to receive the first message. The second message may comprise an acknowledgement of the first message, signifying that the first apparatus has successfully reserved an interface identifier so that it won't be allocated to a further node on at least one further radio interface. The reserving may occur responsive to the first message. The first message may comprise an identifier of a second radio interface indicating that the second apparatus requests the interface identifier be reserved on the second radio interface. The identifier of a radio interface may identify another radio interface comprised in the first apparatus, for example when the first message is received over radio interface 111 it may identify radio interface 112. The identifier may be encoded in bits comprised in the first message. The second message may also comprise the identifier identifying the second radio interface. Where the first message doesn't comprise an identifier of a second radio interface, the first apparatus may be configured to reserve the interface identifier on all radio interfaces comprised in the first apparatus where such reserving is possible. Alternatively the first apparatus may be configured to only reserve the interface identifier on a certain, predetermined radio interface.

The interface identifier may comprise, for example, an IPv4 address. Alternatively, the interface identifier may comprise a modified EUI-64 interface identifier as described above. Alternatively, the interface identifier may comprise a MAC address. Alternatively, the interface identifier in IPv6 may be a random value.

In some embodiments of the invention, the interface identifier reserved by the first apparatus is in use or is taken into use on the first radio interface to at least in part identify or address the second apparatus. Alternatively, another interface identifier may be reserved.

Responsive to reserving the interface identifier, the first apparatus may be configured to act as a gateway for the second apparatus using the second radio interface, such that the second apparatus is addressed using at least in part the reserved interface identifier. For example, where device 110 is the second apparatus and radio interface 111 is the first radio interface, the first apparatus such as gateway 120 may be configured to receive packets from device 110 over radio interface 111 and forward them toward network 130. Gateway 120 may indicate in the forwarded packets a source address comprising the reserved interface identifier. The first apparatus may be configured to act as a gateway for the second apparatus using the second radio interface without performing or participating in separate address configuration procedures over the second radio interface. In other words, when the second apparatus switches to the second radio interface it may begin transmitting data without needing to request, receive or be provisioned with a separate address. This is possible since the interface identifier was reserved for use by the second apparatus on the second radio interface.

The first apparatus may be configured to reserve the interface identifier on the second radio interface, or on several radio interfaces, for a time period. Responsive to expiry of the time period, the first apparatus may be configured to release the interface identifier for allocation to further devices. The second apparatus may express a suggestion for the time period in the first message. The first apparatus may adopt the suggestion or inform the first node of another, shorter, time period that the first apparatus chooses to use. The informing may take place by including an indication in the second message. The first apparatus may also inform the first node of a time period associated with the reserving in the second message if the second apparatus hasn't suggested any time period in the first message.

If before expiry of the time period the first apparatus receives from the second apparatus a refresh message, the first apparatus may be configured to restart the time period. This allows the second apparatus to maintain the reservation of the interface identifier by periodically transmitting refresh messages to the first apparatus. The refresh message may be a keepalive message for the first radio interface, which may comprise an additional reservation refresh indicator, for example.

Figure 4:
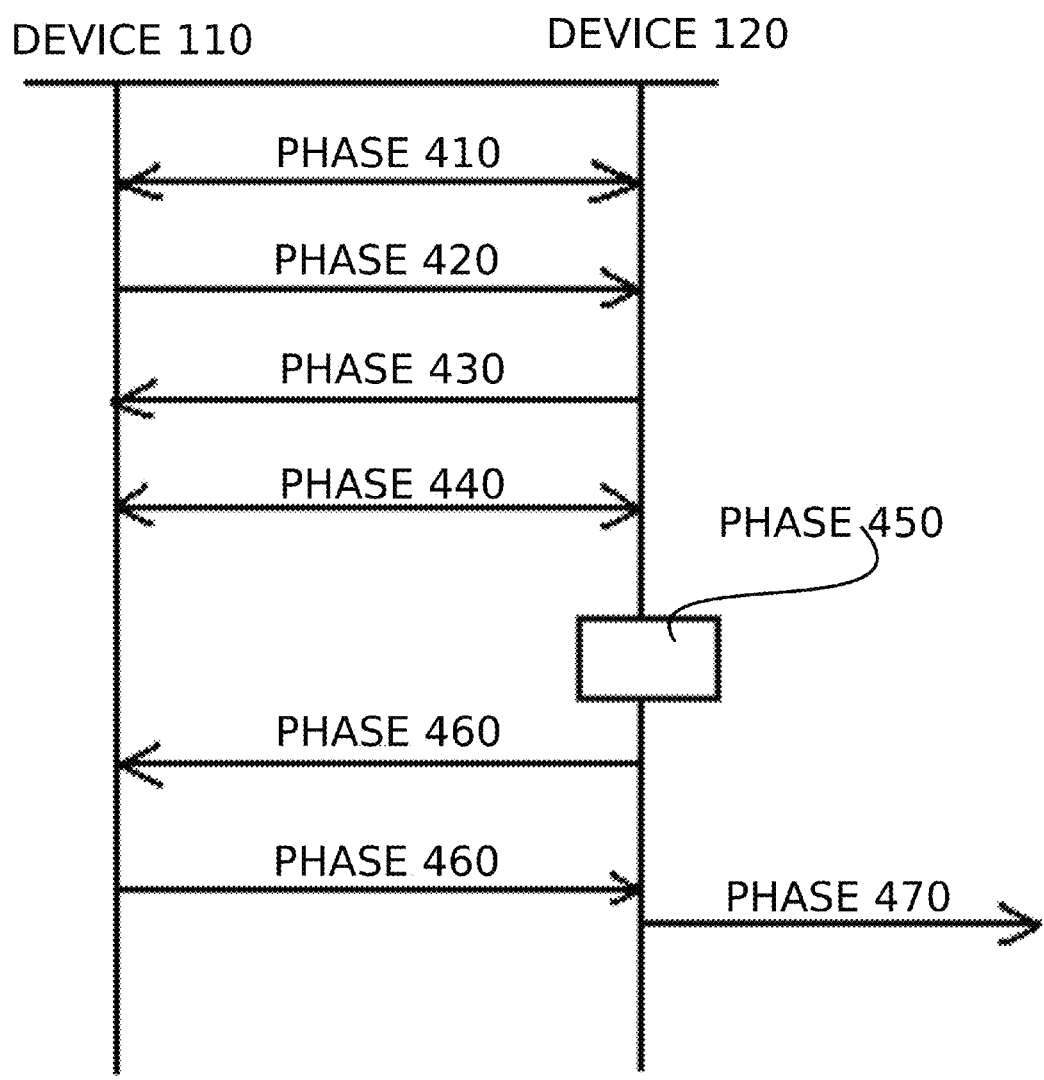
FIG. 4 is a flowchart of an example process according to an embodiment of the invention.

A second apparatus such as device 110 may be configured to transmit, using a transmitter comprised in the second apparatus, a first message comprising a registration request toward a first apparatus such as gateway 120. For example, a first message such as a neighbour solicitation message may be transmitted via radio interface 111 from the second apparatus. An example of a registration request is an address registration request such as an address registration option, ARO. The second apparatus may be further configured to receive a second message from the first apparatus, such as gateway 120, using the same radio interface as was used to transmit the first message. The receiving may take place via a receiver comprised in the second apparatus. The second message may comprise an acknowledgement of the first message, signifying that the first apparatus has successfully reserved an interface indicator so that it won't be allocated by the first apparatus to a further node on at least one further radio interface. The first message may comprise an identifier of a second radio interface indicating that the second apparatus requests the interface identifier be reserved on the second radio interface. The identifier may identify another radio interface comprised in the second apparatus, for example when the first message is received over radio interface 111 it may identify radio interface 112. The identifier may be encoded in bits comprised in the first message. The second message may also comprise the identifier identifying the second radio interface FIG. 4 is a flowchart of an example process according to an embodiment of the invention. In this example, vertical line 110 corresponds to device 110 and vertical line 120 corresponds to gateway 120. In phase 410 device 110 connects to gateway 120 using a WLAN radio interface, for example. In phase 420 device 110 transmits a neighbour solicitation message to gateway 120 over the WLAN interface, the neighbour solicitation message comprising an address registration option, ARO. Device 110 includes in the neighbour solicitation message an indication to inquire if gateway 120 supports the Bluetooth technology. In phase 430 gateway 120 transmits, responsive to the neighbour solicitation message received from device 110, an acknowledgement comprising an indication that gateway 120 supports the Bluetooth technology. The acknowledgement may be transmitted over the WLAN radio interface. In phase 440, device 110 may connect to gateway 120 using the Bluetooth radio interface and establish a Bluetooth connection between device 110 and gateway 120. Connecting to gateway 120 using the Bluetooth radio interface may comprise transmitting a neighbour solicitation message over the Bluetooth radio interface from device 110 to gateway 120. Device 110 may relinquish the prior WLAN connection in connection with forming a Bluetooth connection to gateway 120.

In phase 450, gateway 120 may have received neighbour solicitation messages from device 110 over both the WLAN radio interface and the Bluetooth radio interface. The neighbour solicitation messages may have comprised the same interface identifier of device 110, allowing gateway 120 to deduce that the device is the same device over both interfaces. Gateway 120 can responsively keep the interface identifier of device 110 reserved on the WLAN radio interface while device 110 is connected to gateway 120 over the Bluetooth radio interface only. Gateway 120 may transmit at phase 460 a neighbour advertisement message to device 110 over the Bluetooth radio interface, the neighbor advertisement message comprising an indication that the interface identifier is reserved on at least WLAN. In phase 470 device 110 may determine that it has information to send and it may optionally verify over the Bluetooth radio interface that its IPv6 prefix is valid. Further in phase 470 device 110 may begin transmitting data to gateway 120 for forwarding to a further network, wherein device 110 may be configured to transmit the data via the Bluetooth or the WLAN radio interface, without performing any address configuration in phase 470. In phase 480 gateway 120 forwards data it received in phase 470 to the further network.

Figure 5:
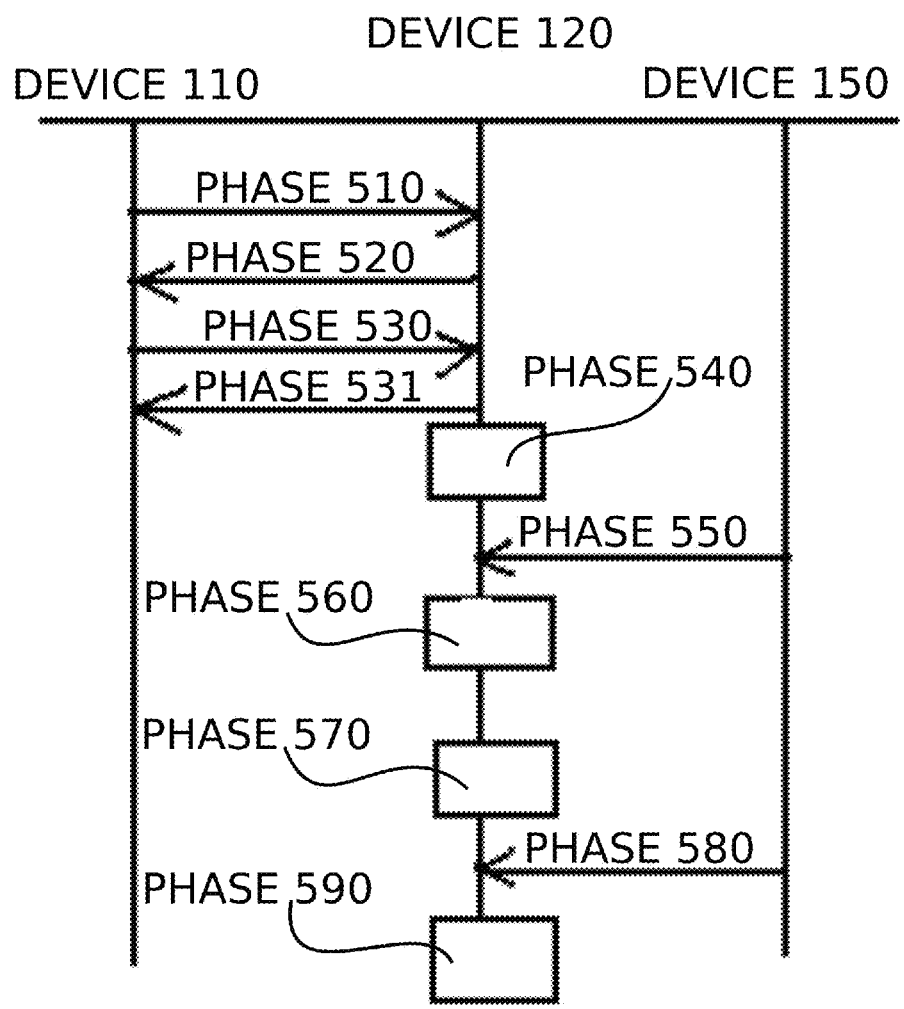
FIG. 5 is a flowchart of an example process according to an embodiment of the invention.

FIG. 5 is a flowchart of an example process according to an embodiment of the invention. Vertical lines 110 and 120 correspond to device 110 and gateway 120 as in FIG. 4. Vertical line 150 corresponds to a further device, such as device 150 of FIG. 1. In phase 510 device 110 transmits over a Bluetooth-low power radio interface to gateway 120 a router solicitation message. In phase 520 gateway 120 responds with a router advertisement message, likewise over the Bluetooth-low power radio interface. In phase 530, device 110 transmits over the Bluetooth-low power radio interface a neighbour solicitation message with an address reservation request. In phase 531 gateway 120 acknowledges, over the Bluetooth-low power radio interface, the address reservation request, wherein the acknowledgement message may comprise a status indicator. The status indicator may inform device 110, for example, of all the radio interfaces over which an interface indicator is now reserved for device 110. In phase 540 gateway 120 may begin reserving the interface indicator, for example the interface indicator that device 110 is using over the Bluetooth-low power radio interface. Phases 531 and 540 may occur substantially simultaneously, or phase 540 may even begin before phase 531. In phase 550 gateway 120 may receive a message, such as a neighbour solicitation message, from further device 150 over a WLAN radio interface. In phase 560 gateway 120 may detect a conflict between an interface identifier requested by further device 150 and an interface identifier reserved for device 110. Responsively, not shown in FIG. 5, gateway 120 may indicate to further device 150 that further device 150 cannot start using the interface identifier affected.

In phase 570 gateway 120 may detect that a timer relating to the reservation of the interface identifier for device 110 expires. Responsive to the expiry, gateway 120 may be configured to stop reserving the interface identifier. In phase 580 gateway 120 may receive, over the WLAN radio interface, a neighbour solicitation message from a further device 150. In phase 590 gateway 120 may determine that the interface identifier requested by further device 150 is available and provide connectivity to further device 150 using the requested interface identifier.

Figure 2:
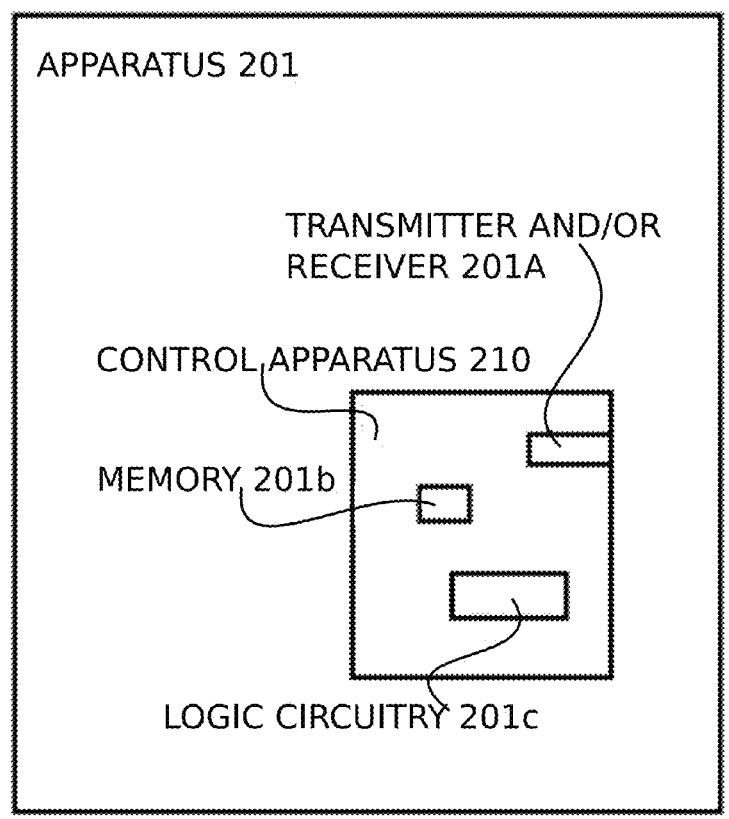
FIG. 2 illustrates an example apparatus capable of supporting embodiments of the present invention.

FIG. 2 illustrates an example apparatus 201 capable of supporting embodiments of the present invention. The apparatus may correspond to device 120, for example. The apparatus is a physically tangible object, for example a mobile telephone, personal digital assistant, data dongle or a similar device. The apparatus may comprise a control apparatus 210, for example a digital signal processor, DSP, processor, microprocessor, field-programmable gate array, FPGA, application-specific integrated circuit, ASIC, chipset or controller. The apparatus may further comprise a transmitter and/or a receiver 210a configured to enable the apparatus 201 to connect to other apparatuses. A combination of transmitter and receiver may be called a transceiver. The apparatus may comprise memory 210b configured to store information, for example reservation information concerning at least one interface identifier. The memory may be solid-state memory, dynamic random access memory, DRAM, magnetic, holographic or other kind of memory. The apparatus may comprise logic circuitry 210c configured to access the memory 210b and control the transmitter and/or a receiver 210a. The logic circuitry 210c may be implemented as software, hardware or a combination of software and hardware. The logic circuitry may comprise at least one processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transmitter and/or receiver 210a. The logic circuitry 210c may be control circuitry. The transmitter and/or receiver 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210. In embodiments where apparatus 201 is a mobile user equipment, apparatus 201 may comprise at least one antenna Without in any way limiting the scope, interpretation, or application of the claims appearing below, a technical effect of one or more of the example embodiments disclosed herein is that delays are reduced when changing from one radio interface to another. Another technical effect of one or more of the example embodiments disclosed herein is that address management is simplified as device 110, for example, can communicate via several radio interfaces using the same address. Another technical effect of one or more of the example embodiments disclosed herein is that changing radio interface can be undertaken more often, which optimizes energy consumption relative to a situation where changing radio interface is slower.

Embodiments of the present invention may be implemented in software, hardware, application logic or a combination of software, hardware and application logic. The software, application logic and/or hardware may reside in memory 210b or control apparatus 210, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a first receiver device configured to receive from a second apparatus over a first radio interface a first message comprising a registration request, the first receiver device being a first radio interface receiver device;
a transmitter configured to transmit a second message to the second apparatus over the first radio interface, the second message comprising an acknowledgement of the registration request;
a processor configured to reserve an interface identifier for the second apparatus, wherein the processor is configured to not allow the reserved interface identifier to be used by further nodes over a second radio interface using a second receiver device comprised in the apparatus, the second receiver device being a second radio interface receiver device, and
wherein the apparatus is further configured to act as a gateway for the second apparatus using the second radio interface such that the second apparatus is addressed using at least in part the reserved interface identifier, wherein the reserved interface identifier is used in addressing messages for transmittal to the second apparatus on the first radio interface and the second radio interface.

2. The apparatus according to claim 1, wherein at least one of the first message and the second message comprises an identifier of the second radio interface.

3. The apparatus according to claim 1, wherein the interface identifier comprises at least one of a medium access control address and a modified extended unique identifier 64, EUI-64, interface identifier.

4. The apparatus according to claim 1, wherein the reserved interface identifier is an interface identifier of the second apparatus on the first radio interface.

5. The apparatus according to claim 1, wherein the apparatus is configured, after transmitting the second message, to act as the gateway for the second apparatus using the second radio interface without performing address configuration procedures over the second radio interface.

6. The apparatus according to claim 1, wherein the processor is configured to reserve the interface identifier for a predetermined time period and to clear the reservation responsive to expiry of the predetermined time period.

7. The apparatus according to claim 6, wherein the processor is configured to restart the predetermined time period responsive to receipt of a refresh message received from the second apparatus over the first radio interface.

8. The apparatus according to claim 7, wherein the refresh message comprises a keepalive message for keeping up a connection on the first radio interface.

9. A method, comprising:
receiving, in a first apparatus, from a second apparatus via a first radio interface receiver device a first message comprising a registration request, wherein the first radio interface receiver device is comprised in the first apparatus;
transmitting, from the first apparatus, a second message to the second apparatus over the first radio interface, the second message comprising an acknowledgement of the registration request, and
reserving an interface identifier for the second apparatus, wherein the reserving comprises not allowing the reserved interface identifier to be used by further nodes via a second radio interface receiver device comprised in the first apparatus, and
acting as a gateway for the second apparatus using the second radio interface such that the second apparatus is addressed using at least in part the reserved interface identifier, wherein the reserved interface identifier is used in addressing messages for transmittal to the second apparatus on the first radio interface and the second radio interface.

10. The method according to claim 9, wherein at least one of the first message and the second message comprises an identifier of the second radio interface.

11. The method according to claim 9, wherein the interface identifier comprises at least one of a medium access control address and a modified EUI-64 interface identifier.

12. The method according to claim 9, wherein the reserved interface identifier is an interface identifier of the second apparatus on the first radio interface.

13. The method according to claim 9, wherein after transmitting the second message, the method further comprises the first apparatus acting as a gateway for the second apparatus using the second radio interface without performing address configuration procedures over the second radio interface.

14. The method according to claim 9, wherein reserving the interface identifier comprises reserving the interface identifier for a predetermined time period and clearing the reservation responsive to expiry of the predetermined time period.

15. The method according to claim 14, further comprising restarting the predetermined time period responsive to receipt of a refresh message from the second apparatus over the first radio interface.

16. The method according to claim 15, wherein the refresh message comprises a keepalive message for keeping up a connection on the first radio interface.

17. A computer program product comprising a non-transitory computer-readable medium bearing computer program code embodied therein for use with a computer, the computer program code comprising:

code for receiving, via a first receiver device comprised in a first apparatus, from a second apparatus over a first radio interface a first message comprising a registration request, the first receiver device being a first radio interface receiver device;

code for transmitting, from the first apparatus, a second message to the second apparatus over the first radio interface, the second message comprising an acknowledgement of the registration request, and code for reserving an interface identifier for the second apparatus, wherein the reserving comprises not allowing the reserved interface identifier to be used by further nodes over a second radio interface using a second receiver device comprised in the first apparatus, the second receiver device being a second radio interface receiver device, and code for acting as a gateway for the second apparatus using the second radio interface such that the second apparatus is addressed using at least in part the reserved interface identifier, wherein the reserved interface identifier is used in addressing messages for transmittal to the second apparatus on the first radio interface and the second radio interface.

\* \* \* \* \*